United States Patent [19]
Mori

[11] Patent Number: 5,694,299
[45] Date of Patent: Dec. 2, 1997

[54] SELECTIVE CALL RECEIVER HAVING A COVER WITH A HOLE FOR A KEY TO PROTRUDE THERETHROUGH

[75] Inventor: Tatsuya Mori, Shizuoka, Japan

[73] Assignee: NEC Corporation, Tokyo, Japan

[21] Appl. No.: 747,683

[22] Filed: Nov. 12, 1996

[30] Foreign Application Priority Data

Nov. 13, 1995 [JP] Japan ................................. 7-294091

[51] Int. Cl.⁶ ............................................... H04B 1/03
[52] U.S. Cl. ....................... 361/814; 361/755; 455/347; 455/348; 455/128
[58] Field of Search ........................... 361/755, 786, 361/814, 800, 816, 818; 455/89, 91, 347, 348, 349, 351, 128, 352; 200/54, 6 A, 304, 305; 340/825.44

[56] References Cited

U.S. PATENT DOCUMENTS

| | | | |
|---|---|---|---|
| 4,719,322 | 1/1988 | Guzik et al. | 200/5 A |
| 4,896,805 | 1/1990 | Klaczak et al. | 224/236 |
| 4,937,860 | 6/1990 | Smith | 700/5 |
| 5,175,873 | 12/1992 | Goldenberg et al. | 455/89 |
| 5,365,750 | 11/1994 | Boubelik | 379/59 |

FOREIGN PATENT DOCUMENTS

| | | |
|---|---|---|
| 2 182 824 A | 5/1987 | United Kingdom . |
| 2 187 610 A | 9/1987 | United Kingdom . |
| WO 96-08101 | 3/1996 | WIPO . |

*Primary Examiner*—Leo P. Picard
*Assistant Examiner*—Anthony Dinkins
*Attorney, Agent, or Firm*—Scully, Scott, Murphy & Presser

[57] ABSTRACT

A selective call receiver has a main body a protective cover. The main body has a display portion and a plurality of keys at a main surface thereof and the cover is rotatably connected with the main body to cover at least the main surface of the main body. The keys of the main body includes a predetermined key protruding from the main surface. At a position corresponding to the predetermined key, the cover has a hole which is larger than a cross section of the predetermined key.

10 Claims, 3 Drawing Sheets

5,694,299

SELECTIVE CALL RECEIVER HAVING A COVER WITH A HOLE FOR A KEY TO PROTRUDE THERETHROUGH

FIELD OF THE INVENTION

The present invention relates to a selective call receiver, and more particularly to a selective call receiver which has a display portion and at least one key at the surface of the main body.

DESCRIPTION OF THE RELATED ART

For a conventional selective call receiver, a description will be made in reference to a perspective view of FIG. 1. The selective call receiver is comprised of a main body accommodating receiver circuits. The main body is provided with a display portion 2 covered with a transparent plate. A message which is received when a selective call receiving operation is displayed on the display portion 2. The surface of the main body 1 of this receiver is further provided with control buttons 3, 4, and 5, which are switches for performing a mode setting operation and a message confirming operation. The display portion 2 and the control buttons 3, 4, and 5 are exposed on the exterior of the main body 1.

The aforementioned conventional selective call receiver, however, has the disadvantage that when carrying it, the transparent plate or the control buttons could directly make contact with or press against another object and thereby causes damages or error operations to easily occur, because the display portion and the control buttons are exposed on the exterior of the main body.

SUMMARY OF THE INVENTION

Accordingly, an object of the present invention is to provide a selective call receiver which minimizes sacrificing the operability, while overcoming the above disadvantage found in the prior art.

To achieve this end, there is provided a selective call receiver which is comprised of a main body and a cover. The main body has a display portion and a plurality of keys at a main surface thereof and the cover is rotatably connected with the main body to cover at least the main surface of the main body. The keys of the main body includes a predetermined key protruding from the main surface.

Further, at a position corresponding to the predetermined key, the cover has a hole which is larger than a cross section of the predetermined key.

It is preferable that the top surface of the predetermined key is lower than an outer surface of the cover when the cover is closed to the main body, and the remaining keys are substantially flush with the main surface of the main body.

Further preferably, the side wall of the hole is tapered to allow easy operation of the predetermined key.

With this arrangement, the present invention has the advantage that the display portion and the predetermined key, which are exposed on the exterior of the main body, can be protected from damages and error operations which are caused by contact with another object and that a reduction in the operability due to the presence of the cover is minimized.

The above and other objects and advantages of the present invention will become apparent from the following detailed description when read in conjunction with the accompanying drawings.

DETAILED DESCRIPTION OF THE PREFERRED EMBODIMENT

Figure 1:
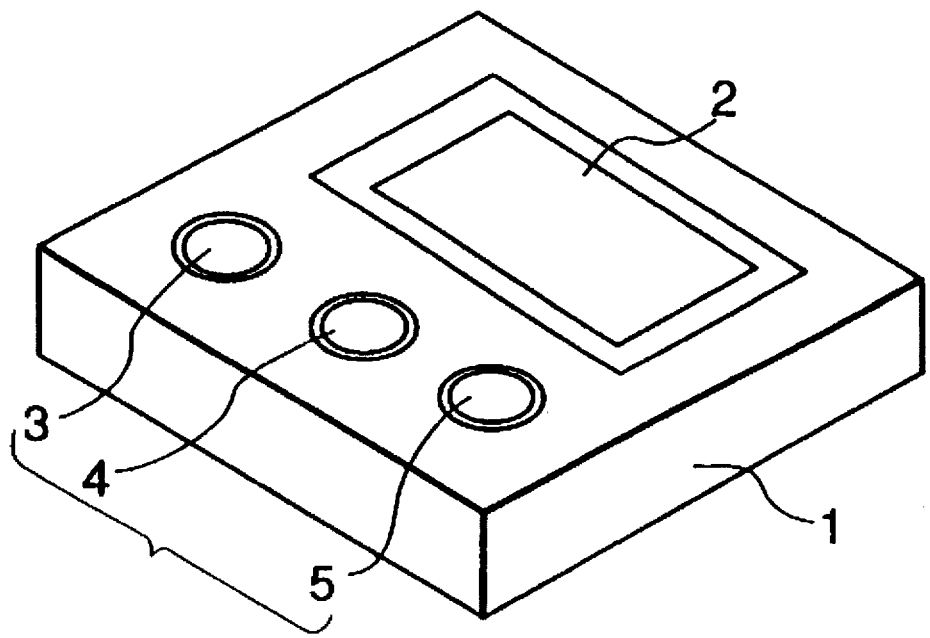
FIG. 1 is a perspective view showing a conventional selective call receiver.
Figure 2A:
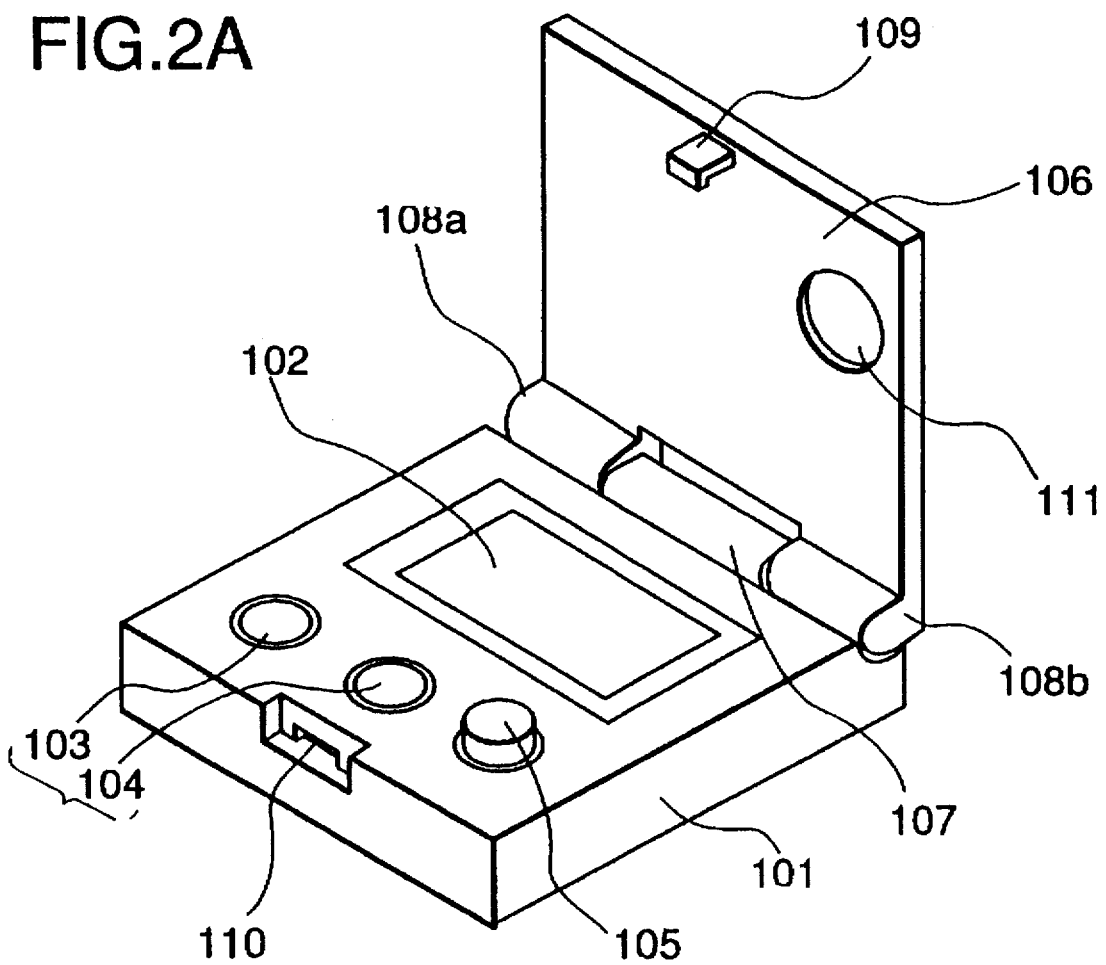
FIG. 2A is a perspective view showing a selective call receiver with a protective cover according to an embodiment of the present invention.
Figure 2B:
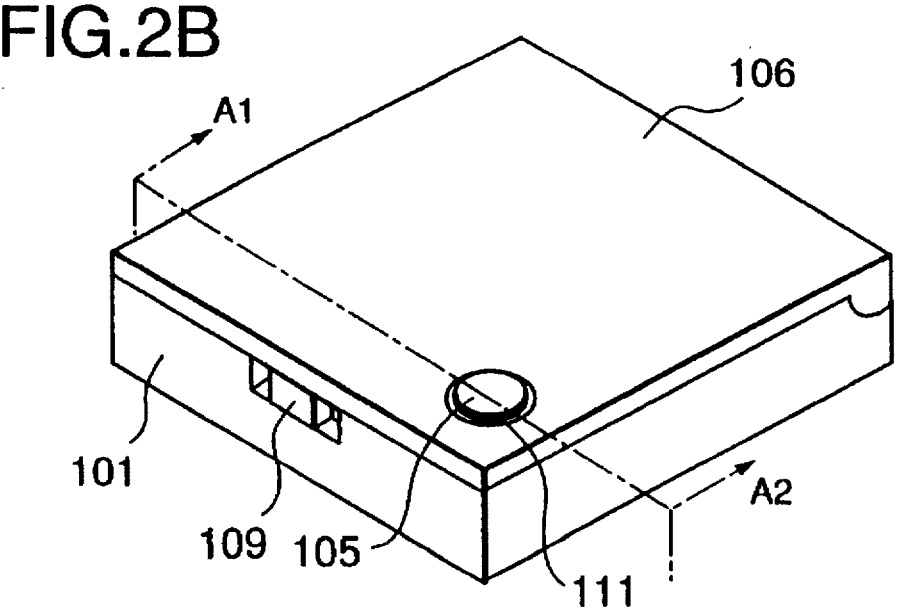
FIG. 2B is a perspective view showing the selective call receiver with the protective cover closed according to the embodiment.

Referring now to FIGS. 2A and 2B, there is shown a selective call receiver according to a preferred embodiment of the present invention. The selective call receiver is equipped with various functional circuits for performing a selective call receiving operation at the interior of a main body 101. The main surface of the main body 101 is provided with a display portion 102 which is protected by a transparent plate such as an acrylic plate. Typically, the display portion 102 is comprised of a liquid-crystal display. A message such as a reception message or a control message is displayed on the display portion 102 when the selective call receiving operation is performed. The main surface of the main body 101 is also provided with control buttons 103, 104, and 105, which are switches for performing a mode setting operation and a message confirming operation. In this embodiment, the control buttons 103 and 104 are embedded in the main body 101 with the surfaces of these buttons being substantially flush with the main surface of the main body 101. On the other hand, the other control button 105 protrudes through the main surface of the main body 101 by a predetermined height.

The selective call receiver is further equipped with a protective cover 106 connected to the main body 101 through a hinge structure. The hinge structure is comprised of a supporting portion 107 which is provided at one end of the main body 101 and bearing portions 108a and 108b which are provided at one end of the protective cover 106 so that the protective cover 106 can be rotatably opened and closed with respect to the one end of the main body 101. The other end of the protective cover 106 is provided with a hook 109 and the other end of the main body 101 is provided with a recess 110 which is detachably coupled to the hook 109.

When the protective cover 106 is closed to the main body 101, then the hook 109 will be hooked on the recess 110. In this way, the protective cover 106 is fastened to the main body 101. When the protective cover 106 is fastened to the main body 101, then the display portion 102 and the control buttons 103–105 can be protected from damages and error operations which are caused by the contact or pressure with another object.

The protective cover 106 is further provided at a position corresponding to the control button 105 with a hole 111 which is larger than the control button 105 so that the control button 105 can be pushed down through this hole 111 when the protective cover 106 is closed as shown in FIG. 2B. More specifically, the diameter of the hole 111 is larger than that of the control button 105 so that the control button 105 can be easily depressed down without keeping contact with the hole 111. In order to effectively protect the control button 105, it is preferable that the shape of the hole 111 is substantially similar to that of the cross section of the control button 105.

Figure 3:
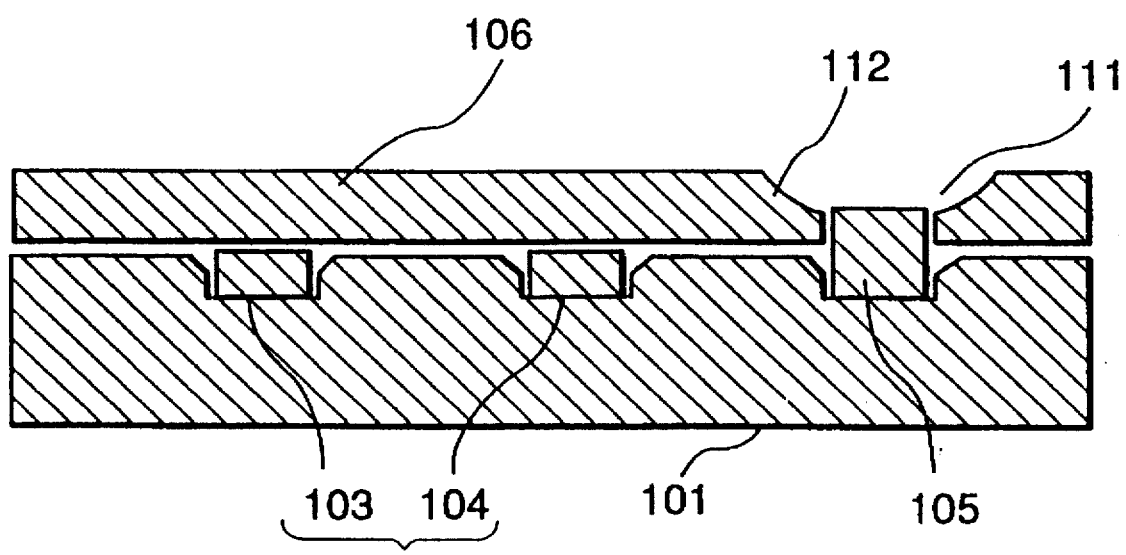
FIG. 3 is a sectional view of the selective call receiver taken substantially along line A1–A2 of FIG. 2B.

Referring to FIG. 3, the top surface of the control button 105 protrudes from the surface of the main body 101 so that the control button 105 can be simply pushed down when the protective cover 106 is closed and fastened to the main body 101. In other words, the control button 105 is provided in an elevated state from the main surface of the main body 101, and on the other hand, the remaining control buttons 103 and 104, which cannot be suitably operated unless the protective cover 106 is opened, are substantially flush with the main surface of the main body 101.

It is preferable that the protruding surface of the control button 105 is slightly lower than the outer surface of the protective cover 106 in order to avoid contact with another object. Since the outer diameter of the control button 105 is usually smaller than the size of the finger of an operator, a tapered portion 112 is formed around the hole 111 of the protective cover 106 so that the pushing-down operation of the control button 105 becomes easy. It is more preferable that the tapered portion 112 is formed with a slight curvature so that it fits into the finger of the operator.

In the selective call receiver as described above, the control button 105 is used to execute a plurality of functions, one of which is an informing stop function. Upon depressing the control button 105 at the time of call reception, the call informing function will be stopped. It is obvious that stoppage of this call informing function can be executed without confirming the message displayed on the display portion 102 of the selective call receiver, that is, without opening the protective cover 106.

As described above, the selective radio call receiver is constructed such that the control button 105, which is used to stop informing a call, can be pushed down without opening the protective cover 106. Therefore, the selective call receiver has the advantage that a reduction in the operability due to the presence of the protective cover 106 can be minimized because a predetermined button can be pushed down without opening the protective cover. It is obvious that the aforementioned structure can be applied to a receiver key which can be operated without confirming a message displayed on the display portion 102.

What is claimed is:

1. A selective call receiver comprising:
   a main body having a display portion and a plurality of keys at a main surface thereof, the keys including a predetermined key protruding from the main surface; and
   a cover rotatably connected with the main body to cover at least the main surface of the main body, the cover having a hole at a position corresponding to the predetermined key, the hole being larger than a cross section of the predetermined key.

2. The selective call receiver as set forth in claim 1, wherein a top surface of the predetermined key is lower than an outer surface of the cover when the cover is closed to the main body.

3. The selective call receiver as set forth in claim 1, wherein a side wall of the hole is tapered to allow easy operation of the predetermined key.

4. The selective call receiver as set forth in claim 2, wherein a side wall of the hole is tapered to allow easy operation of the predetermined key.

5. The selective call receiver as set forth in claim 1, wherein a key other than the predetermined key is substantially flush with the main surface of the main body.

6. The selective call receiver as set forth in claim 2, wherein at least the top surface of the predetermined key is exposed through the hole so as to be operated without viewing the display portion.

7. The selective call receiver as set forth in claim 4, wherein at least the top surface of the predetermined key is exposed through the hole so as to be operated without viewing the display portion.

8. The selective call receiver as set forth in claim 1, wherein the predetermined key is a reset key for stopping an informing operation of call reception.

9. The selective call receiver as set forth in claim 7, wherein the predetermined key is a reset key for stopping an informing operation of call region.

10. The selective call receiver as set forth in claim 1, wherein a shape of the hole is substantially similar to that of the cross section of the predetermined key.

* * * * *

UNITED STATES PATENT AND TRADEMARK OFFICE
CERTIFICATE OF CORRECTION

PATENT NO. : 5,694,299
DATED : December 2, 1997
INVENTOR(S) : Tatsuya Mori

It is certified that error appears in the above-identified patent and that said Letters Patent is hereby corrected as shown below:

In the Abstract, line 1: "body a" should read --body and a protective--

Column 4, line 36, Claim 9: "region" should read --reception--

Signed and Sealed this

Thirtieth Day of November, 1999

Q. TODD DICKINSON

Attest:

Attesting Officer

Acting Commissioner of Patents and Trademarks